Patented Sept. 6, 1949

2,481,419

UNITED STATES PATENT OFFICE 2,481,419

SURGICAL DRESSING

William F. Hamilton, Altadena, Calif., assignor to Frederick M. Turnbull, Los Angeles, Calif.

No Drawing. Application February 13, 1945, Serial No. 577,731

1 Claim. (Cl. 167—51.5)

This application is a continuation in part of copending application Serial No. 480,056, filed March 23, 1943, for Medicated surgical dressing and method of producing same, which application is now abandoned.

This invention relates to an improved surgical dressing formed from a viscous solution and to the solution from which it is formed. The liquid is suitable for direct application to burned, abraded, cut, lacerated, or otherwise injured areas of the body. The liquid contains such ingredients as to cause it, when applied as a coating, covering the injured area, to dry to a tough, adherent, continuous, non-cracking, elastic, transparent, water-resistant film which is perspiration permeable, i. e., permeable to the water vapor from perspiration. The properties of adherence, continuity, water-resistance and vapor-permeability cause the film to promote natural healing of the injured area by protecting such area from the retarding influence of trauma and contamination. The properties of toughness and adherence, together with the properties of its permanence and removability, cause the film to promote natural healing of the injured area by protecting it from irritation and trauma, which might otherwise occur in the repeated removal and reapplication of conventional gauze dressings. The properties of toughness and elasticity cause the film to promote natural healing of the injured area when such area stretches or contracts during bodily movement by closely adhering to the injured area and maintaining its continuity and water-resistance during all such expansion and contraction. The property of transparency promotes the natural healing of the injured area by rendering it unnecessary to remove the dressing, and expose the injured area to the danger of contamination from the air and irritation and trauma, in order to observe the progress of the healing or whether infection has developed. This property and the property of water-insolubility permit the injured area to be treated by hydrotherapy, and light therapy, without removal of the dressing film.

It is an object of this invention to provide a liquid which may be applied over an injury and which dries rapidly, i. e., in a period of a few minutes, to form a film.

It is another object of this invention to provide a liquid which dries when applied and which forms a film which has the hereinbefore described characteristics, and which supplements the desirable properties of normal healthy tissue with anti-bacterial action.

Still another object of this invention is to provide a liquid adapted for rapid evaporation to form a surgical dressing having the attributes described which may be readily removed without injury, irritation, or trauma to the injured area.

A further object of this invention is to provide a surgical dressing which dries to form a non-cracking water-insoluble film which is medicated in such a manner that the medicament is totally extractable by water or body serum without adverse physical effect on the film itself.

Still another object of this invention is to provide a water-insoluble surgical dressing which dries to form upon the injured area a film which is permeable to perspiration and externally applied medicaments, as, for example, ointments, and which prevents the passage of water, dirt, and bacteria inwardly therethrough.

All of the properties and attributes of the surgical dressing or film described herein and in the said copending application are essential to its use upon the body and for all types of injuries, and all of them are interdependent.

In the treatment of many injuries it is highly desirable to apply agents to diminish the flow of blood; for example, the shock, and sometimes the fatal result, from severe burns is attributable in a very large measure to the loss of serum from the burned area. The invention contemplates that there may be included in the surgical dressing not only one or more medicaments which are bacteriostatic or bactericidal agents or both, but also one or more vasoconstrictors which may be effective on the injured area during the application of the liquid and after the dressing has formed. The invention supplements the action of the vasoconstrictor contained in the film of the surgical dressing by the exertion of a mechanical pressure which retards the escape of blood or serum from the injured area, this pressure being the result of the attributes of water-insolubility, toughness, limited elasticity, and tenacious adherence possessed by the film.

It has been found that certain sulfanilamide-type compounds and salts thereof are highly effective as bacteriostatic and bactericidal agents, and that the local application of a vasoconstrictor is very beneficial in the treatment of many types of injury. It is one of the particular objects of this invention to provide a surgical dressing which includes one or more of such compounds. As employed herein the term "sulfanilamide-type compounds" embraces sulfanilamide and the chemotherapeutic derivatives and substitution products thereof, inter alia, the sulfanilamidopyridines (e. g., sulfapyridine), the sulfanilamido-thiazoles (e. g., sulfathiazole), and sulfanilamido-pyrimidines (e g., sulfadiazine); the term "vasoconstrictive amines" embraces the compound a - hydroxy - B-methylamino-propyl-benzene, commonly known as ephedrine, and the various other sympathometic amines having a local vasoconstrictor action similar to that of ephedrine, inter alia:

B-amino-propyl-benzene, or amphetamine
(a-Hydroxy - B - methylamino-ethyl) -3, 4-dihydroxy-benzene, or epinephrine
(Methylamino-acetyl) - 3, 4 - dihydroxy-benzene, or kephrine
(a-Hydroxy-B-methylamino-ethyl) -3 - hydroxy-benzene or neo-synephrin
(a-Hydroxy-B-methylamino-ethyl) -4 - hydroxy-benzene or synephrin
(a - Hydroxy - B-amino-propyl) -benzene, or propadrine
(a-Hydroxy-B - amino - propyl) -3, 4-dihydroxy-benzene or cobefrin
(B-amino-propyl) -4-hydroxy - benzene or paredrine
(B - methylamino - propyl) -benzene or desoxyephedrine.

Also, for convenience, the symbol STC is employed in the specification to represent a member of the group consisting of (1) sulfanilamide-type compounds, and (2) organic salts thereof, and the symbol VA to represent a member of the group consisting of vasoconstrictive amines and acid-addition salts thereof.

The action of the STC and the VA may be synergized by their interaction to form new medicinal agents. It has been shown that the product formed by the interaction of STC and VA is an amine-(acid-addition) salt or onium salt of the general formula

wherein

represents the anion of a sulfanilamide-type compound capable of forming an N-alkali salt, and

represents the cation of a compound formed by the addition of an acid to a vasoconstrictive amine. For example, it has been shown that sulfathiazole and (B-methylamino-propyl)-benzene, or desoxyephedrine, and metathetically interact to form desoxyephedronium sulfathiazole, i. e.,

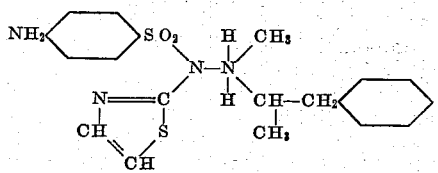

These products may be described as the substituted ammonium salts which are the products of the reaction between an amide and an amine, or as the N' reaction product of a first compound selected from the group consisting of (1) sulfanilamide-type compounds capable of forming N-alkali salts and (2) such salts, and a second compound selected from the group consisting of vasoconstrictive amines and acid-addition salts thereof.

The nature and benefit of the formation of and the properties of these reaction products identified for convenience herein by the symbol RP are fully set forth in the specification and amendments, exhibits and affidavits in the copending application Serial No. 445,514, filed June 2, 1942, now Patent No. 2,478,191 on the application of William F. Hamilton, Melvin F. George, Jr., and Eli Simon. One of the desirable attributes of many of the RP's is that they are more soluble in water than are the STC's from which they were formed.

In the treatment of many types of injuries it is desirable that there be available for local action on the body tissues an excess of either STC or VA over that stoichiometric quantity which combines with the other so that a greater bactericidal or bacteriostatic effect results from the excess of STC or a greater vasoconstrictive action results from an excess of the VA over that obtainable by the use of RP without such an excess. The invention contemplates the inclusion in the surgical dressing therefore of one or more RP's with or without an excess of STC or VA.

In accordance with the invention the liquid surgical dressing is formed of a base which contains a plastic and a volatile solvent for the plastic and the medicament. As hereinafter pointed out, it may contain also an extraction accelerator which quickens the absorption of the medicament from the dressing film by the body tissues.

It is necessary that each of the medicaments which is included in the surgical dressing be stable in this dressing base in the sense that it should not readily precipitate therefrom or react with the ingredients of the base to form toxic, irritating, or otherwise injurious products. It is necessary also that the medicaments be inert with respect to the ingredients of the dressing base in the sense that they do not impair the adherent, tough, continuous, elastic, transparent, water-resistant, perspiration-permeable, non-cracking or pliable attributes of the film formed by the evaporation of the liquid surgical dressing. The term "compatible," as employed herein, means that the medicament to which it is applied possesses these qualities of stability and inertness. Sulfathiazole or sulfanilamide are examples of compatible STC's. Desoxyephedrine, amphetamine, and propadrine are examples of compatible VA's. Desoxyephedronium sulfathiazole, amphetammonium sulfathiazole, and propadronium sulfathiazole are examples of RP's.

In the treatment of an injured area with an STC, particularly where the treatment is to be performed by one not a physician, it is desirable that the rate of supply of the STC to the body tissue be controlled so that it is between the minimum at which the bacteria are destroyed or prevented from increasing to the desired extent and the maximum at which toxic symptoms occur. Similarly, it is necessary in the treatment of an injured area with STC, particularly by one not a physician, that the total quantity of STC absorbed by the body tissue be controlled between that minimum necessary for the desired over-all effective bactericidal and bacteriostatic effect and that maximum inducing symptoms of toxicity. This invention provides a surgical dressing containing STC, which dressing is of such nature that it inherently retains between such limits both the rate of availability for absorption of the STC and the total quantity of STC absorbed.

It is likewise necessary, particularly when applied by one not a physician, that the rate of absorption by the body tissue of VA be controlled between the minimum at which the required vasoconstrictive effect is secured and that upper limit at which toxicity is induced. Similarly, it is necessary that the total quantity of VA available for absorption by the body tissue be controlled between that minimum at which the over-all required vasoconstrictive effect for the required period of time is secured and that maximum at which such side effects or other injurious effects are induced.

This invention provides, in its preferred embodiment, a dressing containing a VA, which dressing is of such character that it invariably controls within such limits both the rate of availability for absorption by the body tissue of the VA and the total quantity of VA available for absorption by the body tissue even when applied by one not a physician.

When an RP is applied to an injured area, it is necessary that both the rate of availability for absorption by the body tissue and the total quantity available for absorption be controlled between limits defined above for the reasons hereinbefore stated. This invention provides, in its preferred embodiment, a surgical dressing containing an RP, which dressing is of such character that both such rates of absorption and quantity absorbed are invariably controlled between such limits, even though applied by one not an expert.

It is desirable, when an STC is applied to an injured area, that the rate of absorption of STC by the body tissue be varied so that the maximum rate of absorption occurs when and shortly after the dressing containing the STC is first applied to destroy the infecting organisms then present and so that this rate of absorption diminishes with the passage of time to a minimum as the necessity for the bactericidal and bacteriostatic effect of the STC diminishes with the continuation of the healing process. This invention provides a surgical dressing containing an STC of such character that, no matter how inexpertly it may be applied, the rate of availability of the STC for absorption by the body tissue is so varied.

When VA is applied to an injured area, it is of great importance that the rate of absorption of VA by the body tissue vary so that it is absorbed at a maximum rate immediately following the application in order to stop quickly the loss of serum or blood conducive to shock, and so that the rate of absorption of VA diminishes very gradually with the passage of time. This invention provides a surgical dressing containing VA, which dressing is of such character that such a variation in the rate of absorption of VA by the body tissue is invariably accomplished.

The rate of absorption of the STC in accordance with this invention is accomplished by properly relating the concentration of the STC in the liquid surgical dressing, and hence in the film, with the extractability of the STC by the body serums.

This invention further controls such rate by the presence of an extraction accelerator which has the property of increasing the rate of absorption of STC by the body tissue.

This invention further controls the quantity of STC available for extraction by the body tissue by properly relating the concentration of STC in the liquid and film dressing with the viscosity of the liquid dressing, and hence the thickness of the film dressing.

This invention controls the rate of extraction of the VA by properly relating the concentration in the liquid and film dressing of the VA and such concentration of the RP with the water-solubility, and hence extractability, of each. It controls the total quantity of VA absorbed by the body tissue by properly relating the concentration of the VA or RP with the viscosity of the liquid dressing, and hence the thickness of the film.

The rate of absorption of STC from the film dressing of this invention is diminished with the passage of time by the decreasing concentration of the STC within the film, since with the STC distributed uniformly throughout the thickness of the film the passage of time serves both to decrease the quantity of STC available for absorption and to increase the thickness of the film through which it must be absorbed. The rate of absorption of the STC is also controlled by the effectiveness of the VA which, to the extent it contracts the vessels, retards such absorption, and by the presence of the extraction accelerator in the film. This invention controls the variation in the rate of absorption of STC by the body tissue through these factors.

This invention controls the variation in the rate of absorption by the body tissue of RP and VA by the relation of the concentration of each in the liquid and film dressing and the concentration of the extraction accelerator.

A liquid surgical dressing which produces a medicated surgical film in accordance with the invention may be formed as set forth in the following examples:

*Example 1*

100 parts by volume of a mixed solvent solution is prepared by adding 62 parts of isopropanol to 35 parts of methylethyl ketone and 3 parts of normal butyl acetate. To this solution is added 5½ parts by weight of pure castor oil, a plasticizer, and 10 parts by weight of pure polyvinyl butyral, a plastic, and the mixture is heated to about 130 to 140° F. with agitation until a clear homogeneous solution is obtained.

To this solution is added one part by weight of finely powdered sulfathiazole, and the mixture is agitated at a temperature of about 130 to 140° F. until the drug has completely dissolved.

To this solution is added 0.025 part by weight of tetrabromo-o-cresol an extraction accelerator and finally 0.10 part by weight of desoxyephedronium sulfathiazole finely powdered is added. The mixture is stirred or agitated until the solution is complete and then strained through a suitable strainer, such as cheesecloth, the strained liquid being placed in air-tight bottles for storage and subsequent use.

*Example 2*

If desired, the procedure described may be modified as follows in order to make approximately one gallon of the solution:

320 grams of pure polyvinyl butyral is dissolved in a mixture of isopropanol, 1684 ml., methylethyl ketone, 1120 ml., and N-butyl acetate, 98 ml. The mixture is maintained at a temperature of about 130 to 140° F. and agitated until it is clear and homogeneous in a container which is tightly stoppered to avoid solvent loss.

To this liquid is added a suspension of finely powdered sulfathiazole, 34.02 grams, in isopropanol, 270 ml., and the temperature maintained, as before, during agitation, until the drug is dissolved.

There is then added a mixture of tetrabromo-o-cresol, 0.86 gram, in isopropanol, 50 ml., and agitation is continued until homogeneity is complete. Finally there is added separately 1.18 grams of desoxyephedrine base and 176 grams of pure castor oil. The liquid is stirred, cooled, and strained through a suitable filter into containers.

In both examples given there is an excess of STC over that combining with the VA to form the RP.

The proportions of the ingredients may be varied within the following approximate limits to provide a medicated surgical dressing having to a practical degree all of the attributes hereinbefore described, the percentage proportions being based upon the finished solution unless otherwise indicated:

Polyvinyl butyral_____ 8 to 14% w./v.
Castor oil_____ 50 to 70% w./w. of resin
Butyl acetate_____ 0 to 6% by vol.
Isopropanol_____ 60 to 80% by vol.
Methylethyl ketone_____ 20 to 40% by vol.
STC_____ 0 to 1½% w./v.
VA_____ 0 to 3% by vol.
Tetrabromo-o-cresol_____ 0 to 0.25% w./v.

The liquid surgical dressing prepared in accordance with Examples 1 and 2 is light yellow to amber in color and is a clear viscous solution.

After the injured areas are rendered as free from dirt and bacterial contamination as is possible by the use of soap and water or any recognized and approved practice, and after the area is thoroughly dried the liquid may be directly applied both to the injured areas and surrounding tissue, since the liquid is self-sterilizing.

It should be noted, however, that iodine, mercurials, or substances which act as irritants to the tissue are contra-indicated, as their presence under the dressing may cause the injured and covered area to become irritated, moist, edematous, or "water-logged."

In the preparation of the surgical dressing it is preferred to add the resin to the solvents first, because the dissolving of the resin is a relatively slow process. It is preferred to add the castor oil and desoxyephedrine base last to avoid discoloration induced by prolonged heating. It is preferred to form the desoxyephedronium sulfathiazole in the solution by the addition of desoxyephedrine base and sulfathiazole instead of adding the desoxyephedronium sulfathiazole to the solution as a powder, because this is only sparingly soluble.

Tetrabromo-o-cresol is added in very small proportions to the medicaments embodied in the surgical dressing for a dual purpose. The compound itself is strong bactericidal, and its presence in the dressing unexpectedly increases the extractability of the sulfathiazole from the film. It also synergizes the bacteriostatic and bactericidal action of the sulfathiazole. Actual measurements established that about 83 to 90% of the drugs were removed from the film produced in accordance with Examples 1 and 2 when a sample of the film, 0.08 to 0.10 mm. in thickness, weighing about 0.2 gram was immersed in distilled water at body temperature, 98.6° F. for 24 hours; whereas, when a film of exactly the same formulation, except that the tetrabomo-o-cresol was omitted, was immersed in water under exactly the same conditions, only about 65% of the drugs were extracted from the film.

The presence of the VA in the liquid surgical dressing may contribute to the extractability of the STC from the film by forming a compound therewith which is more soluble in the body liquids contacting the underside of the film than is the STC. Thus, tests indicate that, under identically the same conditions as defined above, there is extracted about 55% of the sulfathiazole, when there is omitted from the liquid dressing the VA as well as the tetrabromo-o-cresol.

The normal butyl acetate may be entirely omitted from the formulation of Examples 1 and 2 if a slight impairment in the resistance to rupture and wear of the surgical dressing in film form is not objectionable.

The liquid surgical dressing of Examples 1 and 2 must be stored in air-tight containers. For this reason and in order to avoid the contamination of an injured area by the use of applicators, such as brushes, rods, or the like, it is preferred to incapsulate the liquid surgical dressing in prepared gelatin or other materials having the desired properties of deformability, resistance to fracture and rupture, and being inert with respect to the liquid dressing. Such capsules may be so formed as to adapt them for a single, or for repeated, use or application of the dressing.

The liquid medicated surgical dressing produced in accordance with Examples 1 and 2 possesses all of the desirable attributes previously described.

It is believed that the apparent passage of perspiration outwardly through the dressing in film form is due to the continuous passage of water vapor from the perspiration through the film under the influence of the continuous evaporation at the outer surface of the film. It is believed that water is prevented from passing inwardly through the dressing in film form by the absence of evaporation at the inner surface of the film or that the partial pressure of the water vapor on the inside of the film is greater than the partial pressure on the outside of the film or both. It is believed that a medicament, such as an STC in an oil vehicle, when applied to the outer surface of the dressing in film form passes through the film because it is an oil-permeable membrane.

The liquid surgical dressing produced in accordance with Examples 1 and 2 dries in a very few minutes when applied to the injured area and forms a water-resistant, continuous, tough, tenaciously adherent, elastic, non-cracking, transparent, perspiration-permeable film. This film is impermeable to dust, dirt, and bacteria. It may include an STC or a VA or an RP with or without an excess of STC or of a VA. Remedication may be performed without the removal of the film by simply applying the desired medicament, preferably in an oily vehicle, to the exterior of the film or by another application of the liquid surgical dressing which softens and blends with the film over the injured area. When it is desired, the film may be quickly and painlessly removed from the area by the application of the dressing in liquid form to soften the film preliminary to its removal from the area.

The ingredients and their proportions set forth in the preceding examples are effective for burns, abrasions, lacerations, incisions, and similar injuries, and post-operative dressings. The medicament is absorbed by the body tissue from the film, that nearest the tissue being first and most rapidly absorbed and that more distant from the tissue being absorbed at a progressively slower rate. This rate of absorption may be increased or decreased as required for most efficacious treatment of a given injury by increasing or decreasing (or omitting) the concentration of the extraction accelerator, tetrabromo-o-cresol, or the concentration of the VA or both. The total quantity of the medicament absorbed may be increased or decreased by increasing or decreasing its concentration in the surgical dressing or the thickness of the film. The maximum film thickness obtained by one application or coating is determined by the viscosity of the liquid dressing, and this may be increased or decreased by variation of the relative proportions of plastic and solvent.

I claim as my invention:

A liquid containing a dressing base adapted upon a single application for drying to form a continuous, adherent, tough, elastic, non-cracking, water-resistant, water-insoluble, perspiration- and medicament-permeable, transparent, pliable film, said base including polyvinyl butyral about 8 to 14% w./v. of said liquid, and castor oil about 50 to 70% w./w. of polyvinyl butyral, said liquid containing as a solvent isopropanol about 60 to 80% by volume of said liquid and methylethyl ketone about 20 to 40% by volume of said liquid, said liquid containing in therapeutically beneficial concentration a compatible member of the group consisting of (1) sulfanilamide-type compounds capable of forming organic salts and (2) such salts, and said liquid containing as an extraction accelerator for the medicament tetrabromo-o-cresol in concentration up to about 0.25% w./v. of said liquid.

WILLIAM F. HAMILTON.

REFERENCES CITED

The following references are of record in the file of this patent:

UNITED STATES PATENTS

| Number | Name | Date |
| --- | --- | --- |
| 2,274,706 | Keim | Mar. 3, 1942 |
| 2,361,624 | Hamilton et al. | Oct. 21, 1944 |

FOREIGN PATENTS

| Number | Country | Date |
| --- | --- | --- |
| 459,878 | Great Britain | Jan. 18, 1937 |

OTHER REFERENCES

Archives of Surgery, Dec. 1943, vol. 47, pages 583 to 585.

Notes on Methyl Ethyl Ketone by Langeduk, Chemistry and Industry, Sept. 1938, pages 891 to 898.

Surgery, Gynecology and Obstetrics, June 1944, page 49 of Ads.

Bull. Johns Hopkins Hospital, Nov. 1942, pages 304 to 306.

"Of Practical Interest to Every Practitioner," published by A. De St. Kalmas & Co. Ltd., Leicester, England, Jan. 1942, page 4.

Surgery (St. Louis), October 1942, pages 631 to 534.

Program and Abstracts of the Clinical Congress of the American College of Surgeons, Nov. 4 to 7, 1941, page 11.